US008610760B2

(12) United States Patent
Tsai et al.

(10) Patent No.: US 8,610,760 B2
(45) Date of Patent: Dec. 17, 2013

(54) METHOD FOR INTENSIFYING IDENTIFICATION OF THREE-DIMENSIONAL OBJECTS

(75) Inventors: Chih-Hsiang Tsai, Changhua County (TW); Hui-Wen Chen, Taipei (TW); Chao-Ming Wang, Taipei (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 420 days.

(21) Appl. No.: 12/967,060

(22) Filed: Dec. 14, 2010

(65) Prior Publication Data

US 2012/0069151 A1 Mar. 22, 2012

(30) Foreign Application Priority Data

Sep. 21, 2010 (TW) .............................. 99132046 A (51) Int. Cl.
*H04N 13/02* (2006.01)
*H04N 13/04* (2006.01)

(52) U.S. Cl.
USPC .............. 348/47; 348/43; 348/52; 348/60; 348/E13.004; 348/E13.074; 348/E13.075

(58) Field of Classification Search
USPC ...................................... 348/47; 382/103, 152
IPC ........................................................ H04N 13/02
See application file for complete search history.

(56) References Cited

U.S. PATENT DOCUMENTS

| 7,003,136 B1* | 2/2006 | Harville ........................ 382/103 |
| 2004/0247176 A1* | 12/2004 | Aucsmith et al. .............. 382/154 |
| 2008/0113317 A1* | 5/2008 | Kemp et al. .................... 433/215 |
| 2011/0026832 A1* | 2/2011 | LeMoigne-Stewart et al. ............................. 382/199 |

FOREIGN PATENT DOCUMENTS

| EP | 1393581 B1 | 2/2006 |
| WO | 9506897 A1 | 3/1995 |
| WO | 2007044044 A2 | 4/2007 |
| WO | 2007066842 A1 | 6/2007 |

OTHER PUBLICATIONS

Michael Harville, Stereo person tracking with adaptive plan-view templates of height and occupancy statistics, 2004, pp. 127-142, XP-002335791, Image and Vision Computing vol. 22, No. 2, Palo Alto, CA, USA.

* cited by examiner

*Primary Examiner* — Thao Le
*Assistant Examiner* — Long Le
(74) *Attorney, Agent, or Firm* — Winston Hsu; Scott Margo (57) ABSTRACT

A method for intensifying identification of three-dimensional objects identification includes utilizing a left eye camera and a right eye camera to capture a left eye image and a right eye image, calibrating the left eye image and the right eye image to generate a calibrated left eye image and a calibrated right eye image, using the calibrated left eye image and the calibrated right eye image to generate a disparity map, differentiating a three-dimensional object from a background image according to the disparity map, projecting the three-dimensional object onto a plan view, filtering noise out of the plan view to generate a filtered three-dimensional object, determining whether the filtered three-dimensional object contains at least two three-dimensional objects, and separating the at least two three-dimensional objects if the filtered three-dimensional object contains at least two three-dimensional objects.

9 Claims, 6 Drawing Sheets

Noise

FIG. 5A

Boundaries of the three-dimensional objects

METHOD FOR INTENSIFYING IDENTIFICATION OF THREE-DIMENSIONAL OBJECTS

BACKGROUND OF THE INVENTION

1. Field of the Invention

The present invention is related to a method for identifying three-dimensional objects, and particularly to a method for intensifying identification of three-dimensional objects by utilizing a Gaussian filter and a watershed segmentation algorithm to separate at least two aggregated three-dimensional objects.

2. Description of the Prior Art

A user can utilize a stereo camera to capture images including three-dimensional objects, and utilize the images to obtain a disparity map that separates the three-dimensional objects from a background of the images. The user can install the stereo camera in a lean bird's eye view configuration and a plane view configuration to gain insight on positions and motion of the three-dimensional objects in space. Therefore, a system for identification of the three-dimensional objects can apply the above mentioned characteristics of the three-dimensional objects to people counting and/or people detection.

However, when the system identifies the three-dimensional objects (such as people), the system inevitably encounters one three-dimensional object containing two or more three-dimensional objects. The system may misjudge the three-dimensional object containing two or more three-dimensional objects to be a single three-dimensional object, resulting in an error when counting the three-dimensional objects.

SUMMARY OF THE INVENTION

An embodiment provides a method for intensifying identification of three-dimensional objects includes utilizing a left eye camera and a right eye camera to capture a left eye image and a right eye image, calibrating the left eye image and the right eye image to generate a calibrated left eye image and a calibrated right eye image, utilizing the calibrated left eye image and the calibrated right eye image to generate a disparity map, differentiating a three-dimensional object from a background image according to the disparity map, projecting the three-dimensional object onto a plane view, filtering noise out of the plane view to generate a filtered three-dimensional object, determining whether the filtered three-dimensional object contains at least two three-dimensional objects, and separating the at least two three-dimensional objects when the filtered three-dimensional object contains at least two three-dimensional objects.

The present invention provides a method for intensifying identification of three-dimensional objects. The method projects a three-dimensional object generated according to a left eye image and a right eye image onto a plane view, utilizes a Gaussian filter to filter noise of the three-dimensional object and strengthen a profile of the three-dimensional object, and utilizes a watershed segmentation algorithm to separate at least two three-dimensional objects when the three-dimensional object contains the at least two three-dimensional objects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
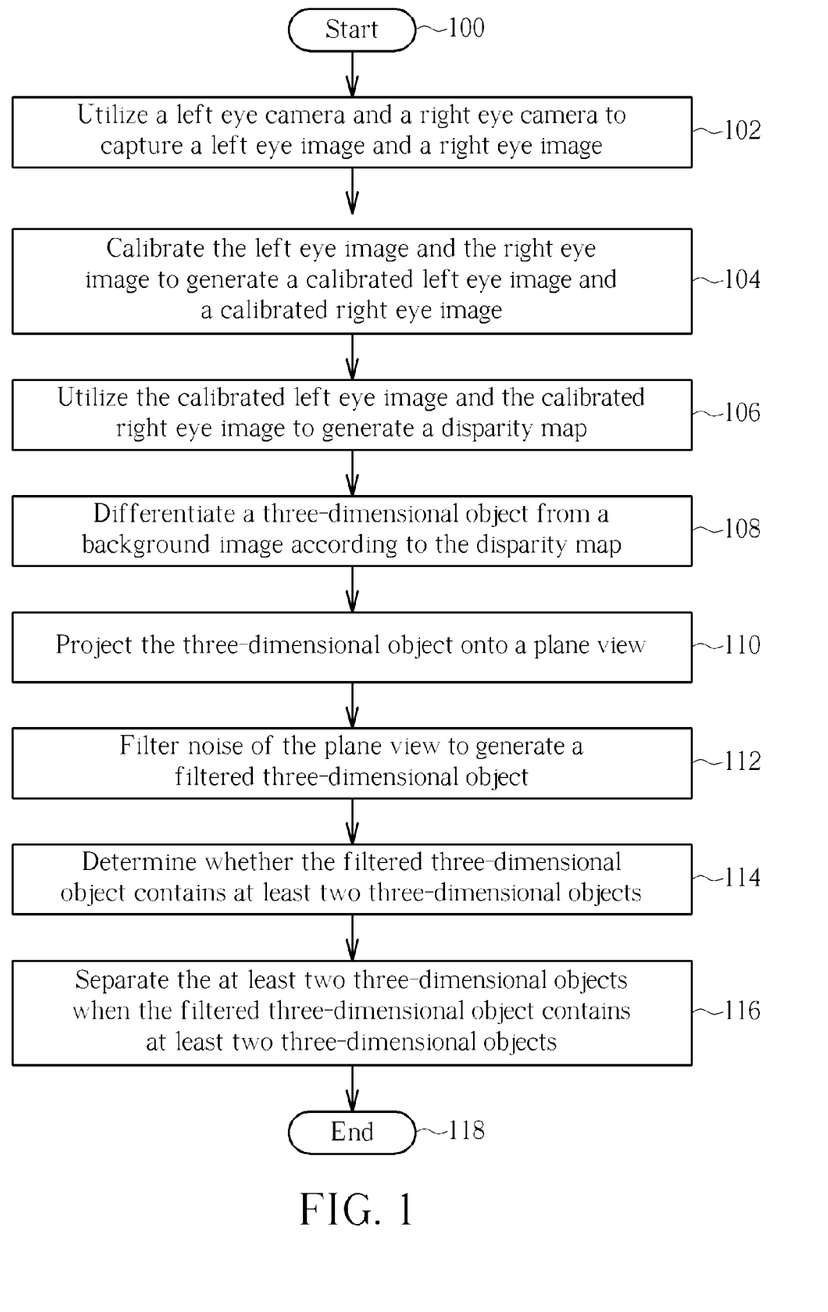
FIG. 1 is a flowchart illustrating a method for intensifying identification of three-dimensional objects according to an embodiment.

Please refer to FIG. 1. FIG. 1 is a flowchart illustrating a method for intensifying identification of three-dimensional objects according to an embodiment. Detailed steps are as follows:

Step 100: Start.

Step 102: Utilize a left eye camera LC and a right eye camera RC to capture a left eye image LI and a right eye image RI.

Step 104: Calibrate the left eye image LI and the right eye image RI to generate a calibrated left eye image CLI and a calibrated right eye image CRI.

Step 106: Utilize the calibrated left eye image CLI and the calibrated right eye image CRI to generate a disparity map.

Step 108: Differentiate a three-dimensional object from a background image according to the disparity map.

Step 110: Project the three-dimensional object onto a plane view.

Step 112: Filter noise of the plane view to generate a filtered three-dimensional object.

Step 114: Determine whether the filtered three-dimensional object contains at least two three-dimensional objects.

Step 116: Separate the at least two three-dimensional objects when the filtered three-dimensional object contains at least two three-dimensional objects.

Step 118: End.

Figure 2:
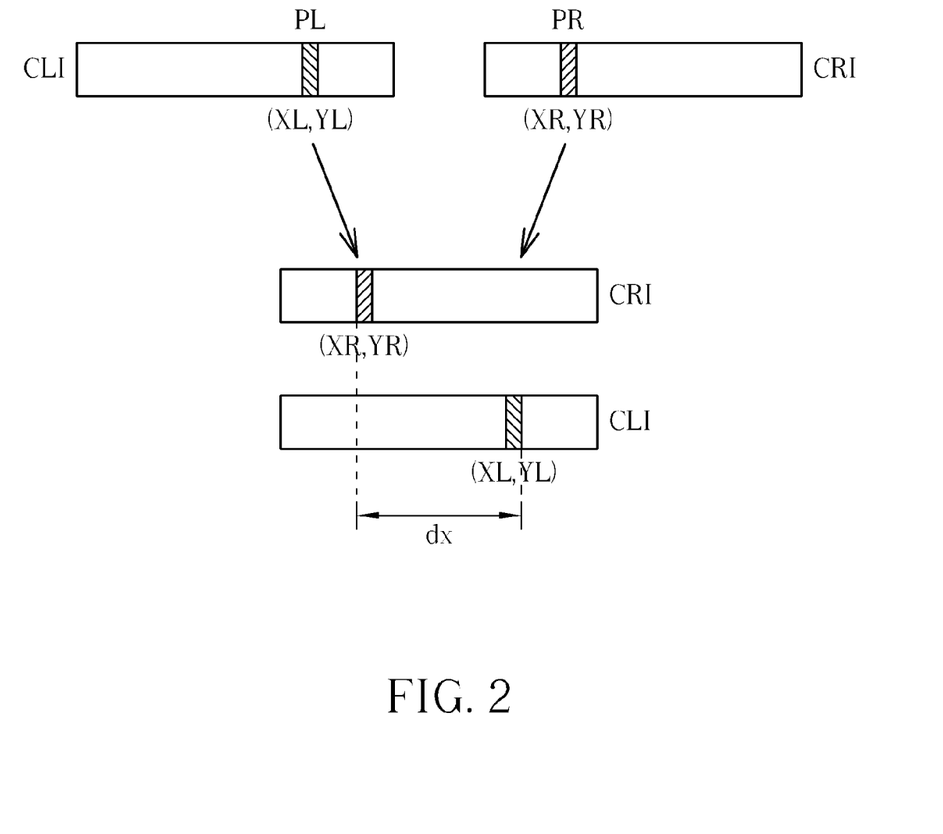
FIG. 2 is a diagram illustrating overlapping the calibrated left eye image and the calibrated right eye image to generate a parallax.
Figure 3:
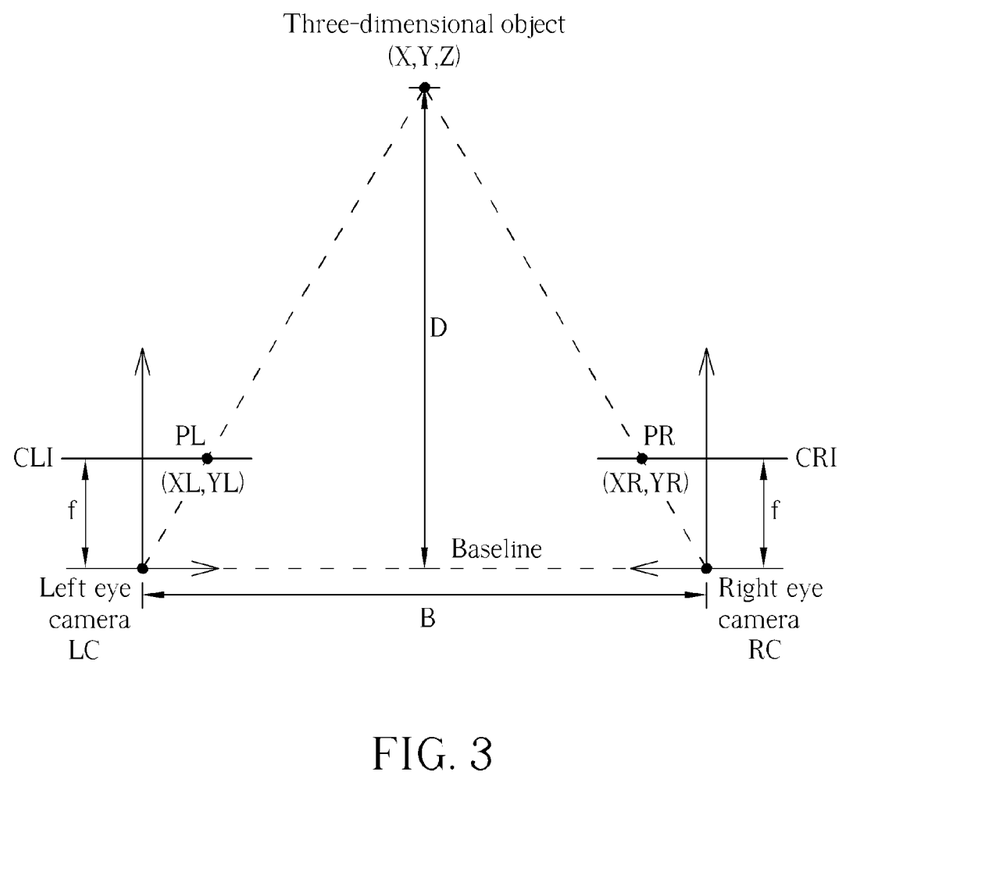
FIG. 3 is a diagram illustrating utilizing the left eye camera and the right eye camera to generate the perception depth.

In Step 104, calibration parameters are utilized to calibrate the left eye image LI and the right eye image RI to generate the calibrated left eye image CLI and the calibrated right eye image CRI, where the calibration parameters include an offline distance B between the left eye camera LC and the right eye camera RC, and the left eye camera LC and the right eye camera RC utilize a synchronization method to capture the left eye image LI and the right eye image RI. In Step 106, the calibrated left eye image CLI and the calibrated right eye image CRI are utilized to generate the disparity map. In the disparity map, a perception depth D is generated between the three-dimensional object and a baseline that the left eye camera LC and the right eye camera RC are located on by the distance B between the left eye camera LC and the right eye camera RC. Please refer to FIG. 2 and FIG. 3. FIG. 2 is a diagram illustrating overlapping the calibrated left eye image CLI and the calibrated right eye image CRI to generate a parallax dx, and FIG. 3 is a diagram illustrating utilizing the left eye camera LC and the right eye camera RC to generate the perception depth D. As shown in FIG. 2, a position PL (XL, YL) is an image formation position of the three-dimensional object in the calibrated left eye image CLI, and a position PR (XR, YR) is an image formation position of the three-dimensional object in the calibrated right eye image CRI, where the three-dimensional object includes the immovable background in the calibrated left eye image CLI and the calibrated right eye image CRI. Therefore, the parallax dx is generated according to the position PL (XL, YL), the position PR (XR, YR), and the equation (1):

$$dx = XR - XL \quad (1)$$

As shown in FIG. 3, the perception depth D of the three-dimensional object is generated according to the distance B between the left eye camera LC and the right eye camera RC, the parallax dx, focal lengths f of the left eye camera LC and the right eye camera RC, and the equation (2), namely a Z coordinate of the three-dimensional object, where the three-dimensional object includes any three-dimensional object in the calibrated left eye image CLI and the calibrated right eye image CRI.

$$D = Z = f*(B/dx) \quad (2)$$

In Step 108, the three-dimensional object is differentiated from the background image according to the disparity map. Particularly, a three-dimensional object different from the background may appear suddenly in the calibrated left eye image CLI and/or the calibrated right eye image CRI. Because perception depth of the ground is unchanged, the three-dimensional object different from the background of the disparity map is determined according to the disparity map generated from Step 106. After the perception depth Z (that is the perception depth D) is generated, an X coordinate and a Y coordinate of the three-dimensional object are generated according to the equation (3) and the equation (4) below. Thus, three-dimensional information of the three-dimensional object is obtained by an image plane of the left eye camera LC and an image plane of the right eye camera RC. Three-dimensional coordinates (X, Y, Z) of the three-dimensional object are generated, where XL of the equation (3) and YL of the equation (4) can be replaced with XR and YR respectively.

$$X = (XL*Z)/f \quad (3)$$

$$Y = (YL*Z)/f \quad (4)$$

Figure 4:
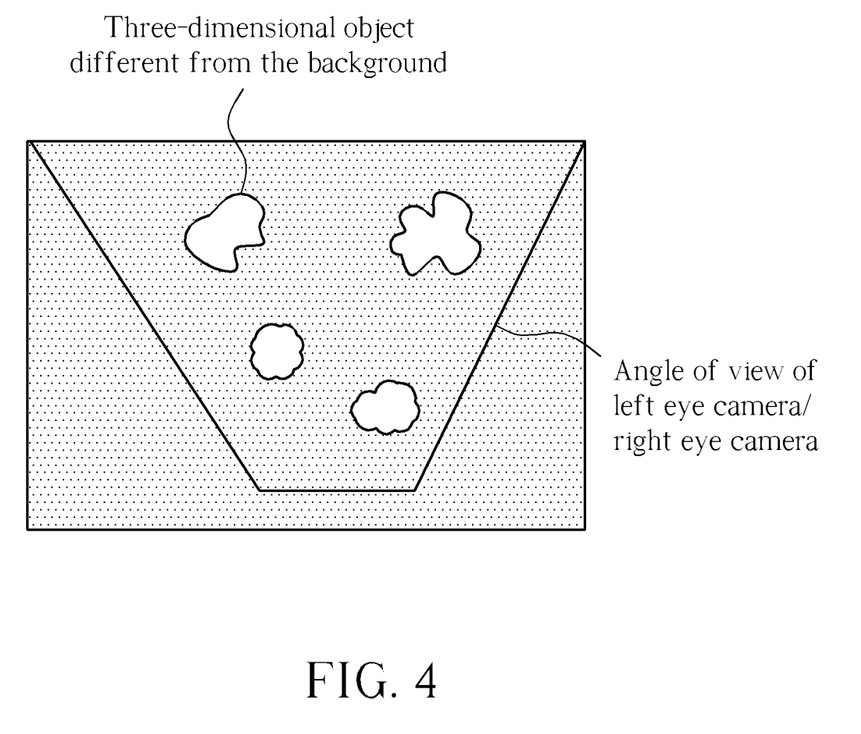
FIG. 4 is a diagram illustrating the three-dimensional object on the plan view.

In Step 110, the user can obtain position information of the three-dimensional object on the plane view. After utilizing the left eye camera LC and the right eye camera RC to generate the three-dimensional information of the three-dimensional object, the three-dimensional object different from the background is first projected onto the plane view, and then the three-dimensional object is observed from a bird's eye view. Please refer to FIG. 4. FIG. 4 is a diagram illustrating the three-dimensional object on the plane view.

In the disparity map, each point of each three-dimensional object on the disparity map is given a projection weight. A formula $F(f_x, f_y, Z_{cam})$ for calculating a projection weight provided by the present invention gives each point on the disparity map the projection weight according to a principle that the further the point is from the baseline, the greater projection weight of the point. After the three-dimensional object of the plane view accumulates the projection weights, the three-dimensional object of the plane view is determined to be noise or a true three-dimensional object according to an accumulation amount of the projection weights.

In Step 112, height information, the projection weight, and the Gaussian filter are utilized to filter the noise of the three-dimensional object according to reference documents, where after the projection weight is improved in Step 110, the system can be certain that a point with less than the projection weight is noise.

In addition, the height information is used for representing a height of each point of the plane view in the space. When the three-dimensional object (such as a person) is projected onto the plane view, the height information of the three-dimensional object usually exhibits a mountain profile. Because a shape of the Gaussian filter is similar to the mountain profile, the system can utilize the Gaussian filter not only to filter the noise of the three-dimensional object but also to strengthen the profile of the three-dimensional object, so as to identify the three-dimensional object.

When three-dimensional objects (such as people) draw together, the three-dimensional objects projected onto the plane view also draw together, which would normally result in the aggregated three-dimensional objects being determined as the same three-dimensional object. Therefore, in Step 112, the Gaussian filter is utilized to strengthen the profile of the three-dimensional object, particularly the "mountain" profile of the three-dimensional object. In Step 114, a "find local extreme" method is utilized to find a "mountaintop", and to determine whether the three-dimensional object contains the at least two three-dimensional objects (that is the three-dimensional object has two or more "mountaintops"). When the three-dimensional object does not contain the at least two three-dimensional objects, a number of the "mountaintops" may only be one, so the three-dimensional object contains possibly at least two three-dimensional objects when the three-dimensional object has two or more "mountaintops".

In Step 116, upon determination that the three-dimensional object (such as people drawn together) has two or more "mountaintops", the system for identification of the three-dimensional objects can utilize the watershed segmentation algorithm to separate the at least two three-dimensional objects. Then, the system determines whether the separated three-dimensional object is the noise or a true three-dimensional object according to range of the separated three-dimensional object. Therefore, the system determines that the separated three-dimensional object is the true three-dimensional object as long as the range of the separated three-dimensional object is sufficient; otherwise the separated three-dimensional object is the noise.

Figure 5A:
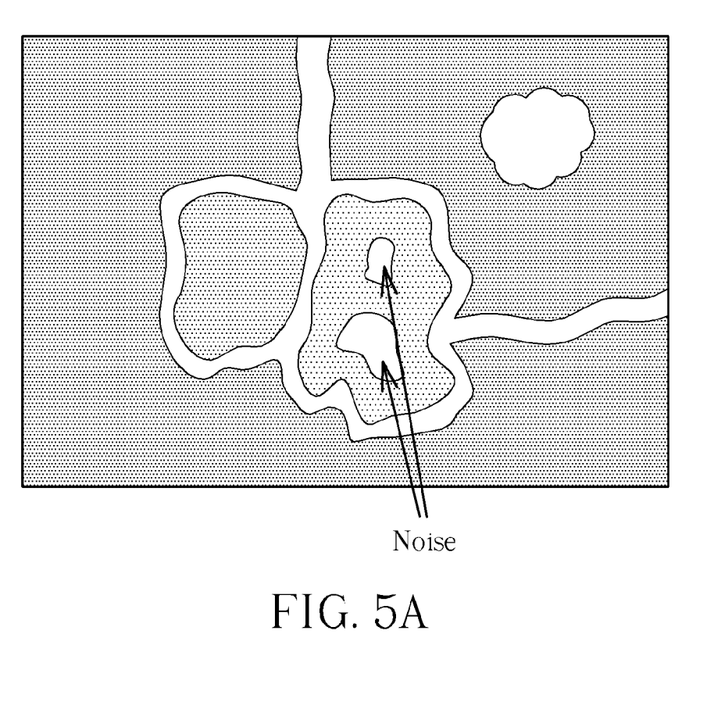
FIG. 5A is a diagram illustrating an image being shown according to luminance of each pixel.
Figure 5B:
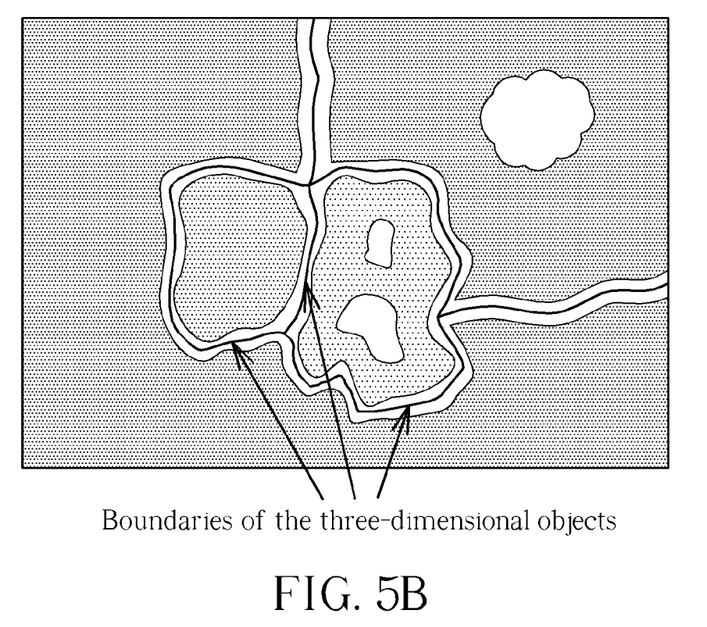
FIG. 5B is a diagram illustrating utilizing the watershed segmentation algorithm to separate the at least two three-dimensional objects.

Please refer to FIG. 5A and FIG. 5B. FIG. 5A is a diagram illustrating showing an image according to luminance of each pixel of the image, and FIG. 5B is a diagram illustrating utilizing the watershed segmentation algorithm to separate the at least two three-dimensional objects. As shown in FIG. 5A, luminance of a white area is greater, and luminance of an area having the densest screen dots is lower. A main concept of the watershed segmentation algorithm is that a whole image is regarded as a topographic map, where the luminance of each pixel is a height of the topographic map. Therefore, the system for identification of the three-dimensional objects can find watersheds from the topographic map to separate the three-dimensional object containing two or more three-dimensional objects. As shown in FIG. 5B, the system for identification of the three-dimensional objects can find all watersheds according to the luminance of each pixel of FIG. 5A, that is boundaries of the three-dimensional objects, to separate the three-dimensional object containing two or more three-dimensional objects of the plane view.

Figure 6:
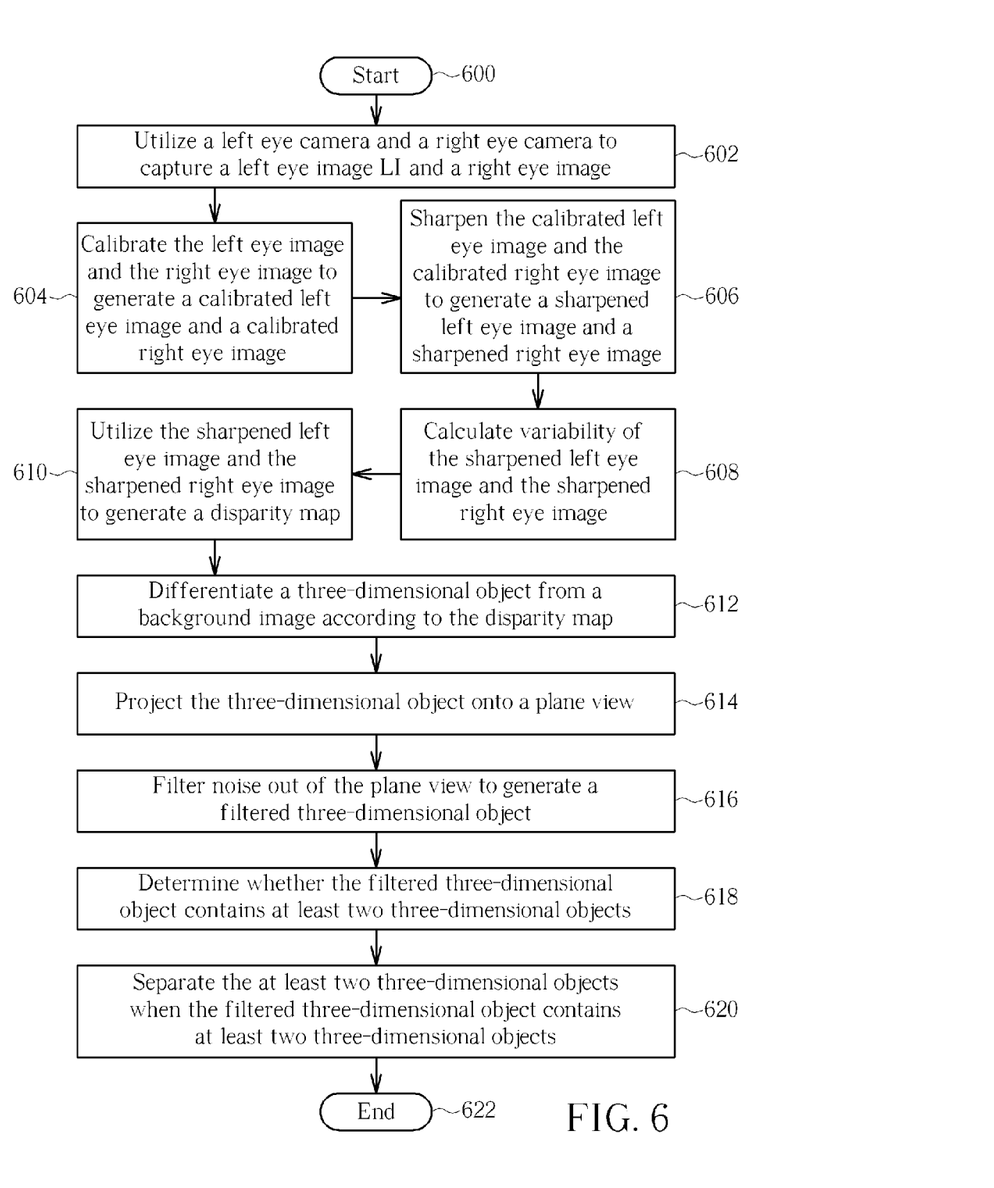
FIG. 6 is a flowchart illustrating a method for intensifying identification of three-dimensional objects according to another embodiment.

Please refer to FIG. 6. FIG. 6 is a flowchart illustrating a method for intensifying identification of three-dimensional objects according to another embodiment. Detailed steps are as follows:

Step 600: Start.

Step 602: Utilize a left eye camera LC and a right eye camera RC to capture a left eye image LI and a right eye image RI.

Step 604: Calibrate the left eye image LI and the right eye image RI to generate a calibrated left eye image CLI and a calibrated right eye image CRI.

Step 606: Sharpen the calibrated left eye image CLI and the calibrated right eye image CRI to generate a sharpened left eye image SLI and a sharpened right eye image SRI.

Step 608: Calculate variability of the sharpened left eye image SLI and the sharpened right eye image SRI.

Step 610: Utilize the sharpened left eye image SLI and the sharpened right eye image SRI to generate a disparity map.

Step 612: Differentiate a three-dimensional object (such as people) from a background image according to the disparity map.

Step 614: Project the three-dimensional object onto a plane view.

Step 616: Filter noise out of the plane view to generate a filtered three-dimensional object.

Step 618: Determine whether the filtered three-dimensional object contains at least two three-dimensional objects.

Step 620: Separate the at least two three-dimensional objects when the filtered three-dimensional object contains at least two three-dimensional objects.

Step 622: End.

A difference between the method in FIG. 6 and the method in FIG. 1 is that the method in FIG. 6 has Step 606 and Step 608. In Step 606, sharpening the calibrated left eye image CLI and the calibrated right eye image CRI is utilizing a high pass filter to strengthen high frequency components of the calibrated left eye image CLI and the calibrated right eye image CRI, e.g. edges and/or patterns of the calibrated left eye image CLI and the calibrated right eye image CRI. In Step 608, calculating the variability of the sharpened left eye image SLI and the sharpened right eye image SRI is identifying and removing a smooth and featureless area, e.g. a wall of the background image. Because the system for identification of the three-dimensional objects is used for differentiating the three-dimensional objects (such as people) from the background image, the smooth and featureless area is removed to reduce a load of the system. Further, subsequent operational principles of the method in FIG. 6 are the same as those of the method in FIG. 1, so further description thereof is omitted for simplicity.

To sum up, the method for intensifying identification of the three-dimensional objects projects the three-dimensional object generated according to the left eye image and the right eye image onto the plane view, utilizes the Gaussian filter to filter the noise of the three-dimensional object and strengthen the profiles of the three-dimensional object, and utilizes the watershed segmentation algorithm to separate the at least two three-dimensional objects when the filtered three-dimensional object contains the at least two three-dimensional objects. Therefore, the present invention may be applied to locations requiring people counting and/or people detection, e.g. supermarkets, cinemas and department stores. And, the present invention can also be applied to a platform warning area or other warning area, so an alarm is triggered immediately as long as the system for identification of the three-dimensional objects detects the three-dimensional objects (such as people).

Those skilled in the art will readily observe that numerous modifications and alterations of the device and method may be made while retaining the teachings of the invention.

What is claimed is:

1. A method for intensifying identification of three-dimensional objects, the method comprising:
    utilizing a left eye camera and a right eye camera to capture a left eye image and a right eye image;
    calibrating the left eye image and the right eye image to generate a calibrated left eye image and a calibrated right eye image;
    utilizing the calibrated left eye image and the calibrated right eye image to generate a disparity map;
    differentiating a three-dimensional object from a background image according to the disparity map;
    giving a corresponding projection weight to each point of the three-dimensional object for projecting the three-dimensional object onto a plane view, wherein the corresponding projection weight corresponds to a distance between the point and the left eye camera/the right eye camera;
    filtering noise out of the plane view to generate a filtered three-dimensional object;
    determining whether the filtered three-dimensional object contains at least two three-dimensional objects; and
    utilizing a Watershed Segmentation Algorithm to separate the at least two three-dimensional objects according to height information of the filtered three-dimensional object of the plane view when the filtered three-dimensional object contains at least two three-dimensional objects.

2. The method of claim 1, wherein utilizing the left eye camera and the right eye camera to capture the left eye image and the right eye image is utilizing a synchronization method to capture the left eye image and the right eye image.

3. The method of claim 1, wherein calibrating the left eye image and the right eye image is calibrating the left eye image and the right eye image according to a distance between the left eye camera and the right eye camera.

4. The method of claim 1, further comprising:
    sharpening the calibrated left eye image and the calibrated right eye image to generate a sharpened left eye image and a sharpened right eye image; and
    calculating variability of the sharpened left eye image and the sharpened right eye image.

5. The method of claim 4, wherein sharpening the calibrated left eye image and the calibrated right eye image is utilizing a high pass filter to strengthen high frequency parts of the calibrated left eye image and the calibrated right eye image.

6. The method of claim 1, wherein utilizing the calibrated left eye image and the calibrated right eye image to generate the disparity map is overlapping the calibrated left eye image and the calibrated right eye image to generate the disparity map.

7. The method of claim 1, wherein differentiating the three-dimensional object from the background image of the disparity map is utilizing a depth difference between the background image and the three-dimensional object to differentiate the three-dimensional object from the background image.

8. The method of claim 1, wherein filtering the noise out of the plane view is utilizing a Gaussian filter to filter the noise out of the plane view.

9. The method of claim 1, wherein separating the at least two three-dimensional objects according to the watershed segmentation algorithm is obtaining each boundary of the at least two three-dimensional objects according to luminance of each pixel of the at least two three-dimensional objects to separate the at least two three-dimensional objects.

\* \* \* \* \*